US012705464B2

(12) United States Patent
Ahn et al.

(10) Patent No.: US 12,705,464 B2
(45) Date of Patent: Aug. 11, 2026

(54) DEVICE AND METHOD WITH TRANSFORMER MODEL IMPLEMENTATION

(71) Applicants: SAMSUNG ELECTRONICS CO., LTD., Suwon-si (KR); SNU R&DB FOUNDATION, Seoul (KR)

(72) Inventors: Jung Ho Ahn, Seoul (KR); Sunjung Lee, Seoul (KR); Hailong Li, Seoul (KR); Jaewan Choi, Incheon (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 926 days.

(21) Appl. No.: 17/887,145

(22) Filed: Aug. 12, 2022

(65) Prior Publication Data

US 2023/0138659 A1 May 4, 2023

(30) Foreign Application Priority Data

Oct. 29, 2021 (KR) ........................ 10-2021-0146841

(51) Int. Cl.
*G06N 3/048* (2023.01)
*G06N 3/045* (2023.01)

(52) U.S. Cl.
CPC ............. *G06N 3/048* (2023.01); *G06N 3/045* (2023.01)

(58) Field of Classification Search
CPC ............................... G06N 3/048; G06N 3/045
See application file for complete search history.

(56) References Cited

U.S. PATENT DOCUMENTS 9,875,104 B2 1/2018 Woo et al.
11,100,288 B1 * 8/2021 Gowayyed ............. G06N 3/084
11,848,104 B2 * 12/2023 Prieditis ................. G16H 50/50
11,886,359 B2 * 1/2024 Bhoja ................. G06F 13/1668
(Continued)

FOREIGN PATENT DOCUMENTS

KR 10-1837262 B1 4/2018
KR 10-2019-0008514 A 1/2019
KR 10-2020-0000216 A 1/2020

OTHER PUBLICATIONS

Hoang, Hieu et al., "Fast Neural Machine Translation Implementation," arXiv:1805.09863v3, Jun. 7, 2018, (6 Pages in English).
(Continued)

*Primary Examiner* — Mohammed H Zuberi
(74) *Attorney, Agent, or Firm* — NSIP Law

(57) ABSTRACT

A device and method with transformer model implementation are provided. The electronic device includes a processor configured to perform an inference by implementing a transformer model including a plurality of encoders and a plurality of decoders, and a memory configured to store instructions to be executed by the processor. Each of the encoders and the decoders includes an attention block that determines an attention value. The processor is configured to perform a first sub-softmax tile-wise operation in the attention block, perform a reduction operation to determine an adjustment factor based on a resulting value of the first sub-softmax operation, and perform a second sub-softmax tile-wise operation based on a resulting value of the reduction operation.

20 Claims, 9 Drawing Sheets

(56) References Cited

U.S. PATENT DOCUMENTS

| | | | | |
|---|---|---|---|---|
| 12,271,321 | B2 * | 4/2025 | Bhoja | G06F 1/324 |
| 2017/0287103 | A1 | 10/2017 | Meixner et al. | |
| 2019/0043379 | A1 * | 2/2019 | Yuan | G09B 7/02 |
| 2019/0370651 | A1 * | 12/2019 | Cheng | G06F 18/23 |
| 2020/0026988 | A1 * | 1/2020 | Guo | G06N 3/082 |
| 2020/0302290 | A1 * | 9/2020 | Lee | G06N 3/08 |
| 2021/0064372 | A1 * | 3/2021 | Sun | G06F 7/483 |
| 2022/0134435 | A1 * | 5/2022 | Scime | G06T 7/11 264/112 |
| 2022/0335303 | A1 * | 10/2022 | Haidar | G06N 3/082 |
| 2023/0359697 | A1 * | 11/2023 | Jiang | G06F 17/16 |
| 2024/0241841 | A1 * | 7/2024 | Bhoja | G06N 3/063 |
| 2024/0320490 | A1 * | 9/2024 | Priya | G06N 3/084 |

OTHER PUBLICATIONS

Milakov, Maxim et al., "Online Normalizer Calculation for Softmax," arXiv:1805.02867v2, Jul. 28, 2018, (9 Pages in English).

Gale, Trevor et al., "Sparse GPU Kernels for Deep Learning," arXiv:2006.10901v2, Aug. 31, 200, (13 Pages in English).

Stevens, Jacob et al., "Softermax: Hardware/Software Co-Design of an Efficient Softmax for Transformers," arXiv:2103.09301v1, Mar. 16, 2021, (7 Pages in English).

Extended European Search Report Issued on Mar. 1, 2023, in Counterpart European Patent Application No. 22204537.9 (8 Pages in English).

Hsueh, Bo Yang "Faster Transformer." *Nvidia* (Dec. 18, 2019), Slide pp. 1-55.

Ivanov, Andrei et al. "Data movement is all you need: A case study on optimizing transformers" *Proceedings of Machine Learning and Systems* 3 (2021): pp. 711-732.

* cited by examiner

FIG. 4

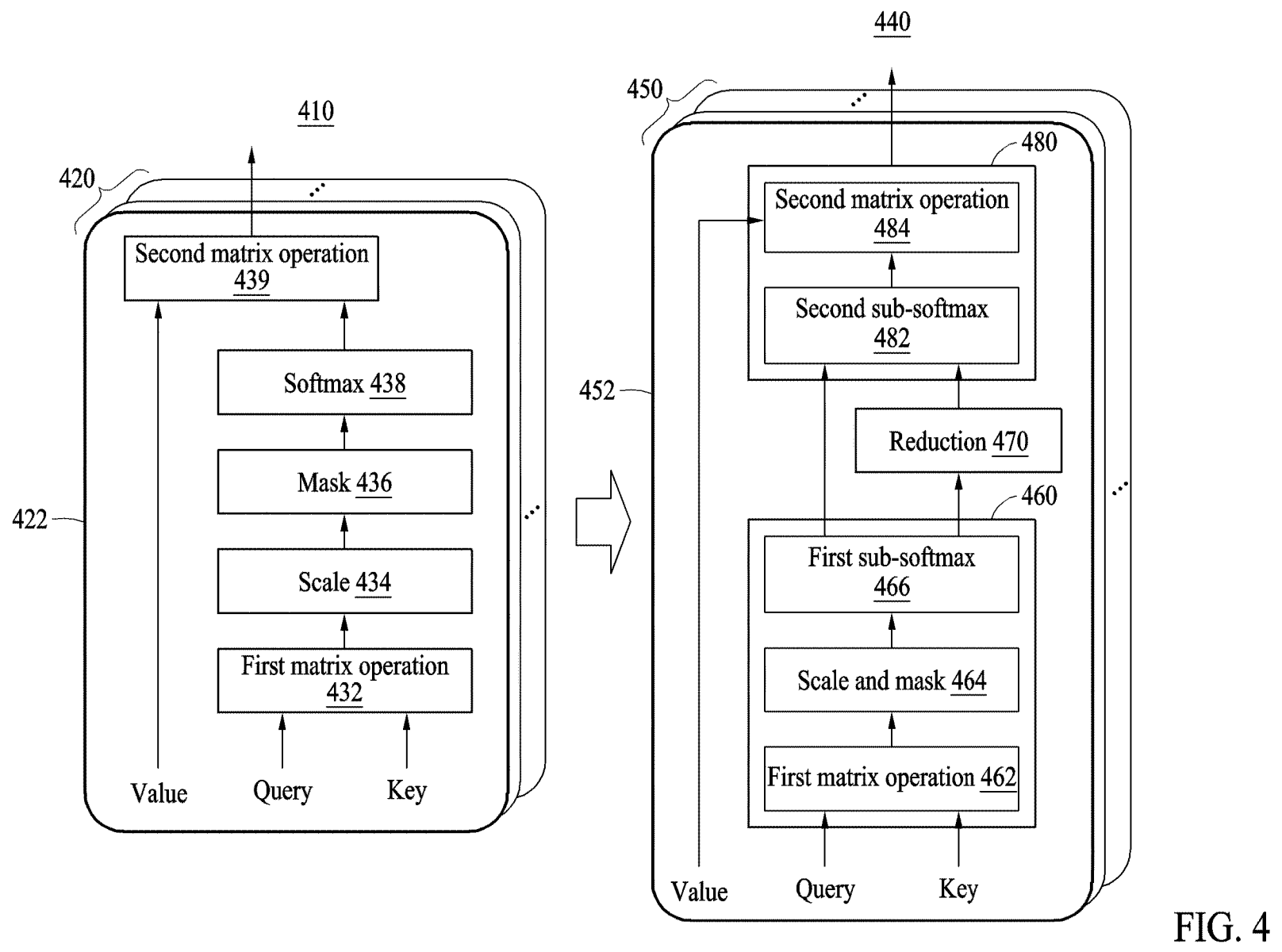

410
420
422
Query
Key
Value
First matrix operation 432
Scale 434
Mask 436
Softmax 438
Second matrix operation 439

452

440
450
460
480
Query
Key
Value
First matrix operation 462
Scale and mask 464
First sub-softmax 466
Reduction 470
Second sub-softmax 482
Second matrix operation 484

DEVICE AND METHOD WITH TRANSFORMER MODEL IMPLEMENTATION

CROSS-REFERENCE TO RELATED APPLICATIONS

This application claims the benefit under 35 USC § 119(a) of Korean Patent Application No. 10-2021-0146841 filed on Oct. 29, 2021, in the Korean Intellectual Property Office, the entire disclosure of which is incorporated herein by reference for all purposes.

BACKGROUND

1. Field

The following description relates to a transformer model and electronic device implementing inference model.

2. Description of Related Art

A transformer model may be a model that is implemented with attention or self-attention while following an encoder-decoder structure, which may be an existing seq2seq structure. Although the transformer model may adopt the encoder-decoder structure without implementing a recurrent neural network (RNN), the performance may be generally better than the performance of the RNN. The transformer model may be mainly implemented to perform tasks such as, but not limited to, natural language processing (NLP), translation, question and answering (Q&A), and the like.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an electronic device includes a processor configured implement a transformer model comprising a plurality of encoders and a plurality of decoders; wherein each of the plurality of encoders and the plurality of decoders comprise an attention block that is configured to determine an attention value, and wherein the processor is further configured to: perform, in an inference operation a first sub-softmax tile-wise operation in the attention block, perform a reduction operation to determine an adjustment factor based on a resulting value of the first sub-softmax tile-wise operation, and perform a second sub-softmax tile-wise operation based on a resulting value of the reduction operation.

The electronic device may include a memory storing instructions to be executed by the processor, to configure the processor to perform the inference operation.

The processor may be further configured to perform a first matrix operation based on a query and a key, and perform the first sub-softmax tile-wise operation based on a resulting value of the first matrix operation.

The processor may be further configured to perform a scale and mask operation on the resulting value of the first matrix operation, and perform the first sub-softmax tile-wise operation based on a resulting value of the scale and mask operation.

The processor may be further configured to perform the first sub-softmax tile-wise operation by detecting a first maximum value tile-wise from input data, determining a first exponentiated value of a resulting value obtained by subtracting the first maximum value from each value of the input data, and determining a first sum value of the first exponentiated value tile-wise.

The first matrix operation and the first sub-softmax operation may be same in a data reading order and a data reading unit.

The processor may be further configured to perform the reduction operation by: determining a second exponentiated value of a resulting value obtained by subtracting, from the first maximum value, a second maximum value which is a maximum value of all tiles of the data; determining a second sum value by applying, to the first sum value, the second exponentiated value corresponding to each tile of the data; and determining, to be the adjustment factor, a resulting value obtained by dividing the second exponentiated value by the second sum value.

The processor may be further configured to perform the second sub-softmax operation by applying the adjustment factor to the first exponentiated value.

The processor may be further configured to perform a second tile-wise matrix operation based on a resulting value of the second sub-softmax tile-wise operation and a given data value.

The second sub-softmax tile-wise operation and the second tile-wise matrix operation may be same in a data reading order and a data reading unit.

In a general aspect, an electronic device includes a processor configured to implement a transformer model comprising a plurality of encoders and a plurality of decoders; and reduction circuitry, wherein each of the plurality of encoders and the plurality of decoders include wherein, the processor is configured to perform a first sub-softmax tile-wise operation in the attention block, an attention block that is configured to determine an attention value, wherein the reduction circuitry is configured to perform a reduction operation to determine an adjustment factor based on a resulting value of the first sub-softmax tile-wise operation, and wherein the processor is configured to perform a second sub-softmax tile-wise operation based on a resulting value of the reduction operation.

The processor may be further configured to perform, in an inference operation, the first sub-softmax tile-wise operation by detecting a first maximum value tile-wise from input data, determining a first exponentiated value of a resulting value obtained by subtracting the first maximum value from each value of the input data, and determining a first sum value of the first exponentiated value tile-wise.

The reduction circuitry may include a comparator, an adder-subtractor, an exponent processor, a multiplication and division operator, and a memory.

The reduction circuitry may be configured to read the first maximum value and the first sum value from the memory; detect, by the comparator, a second maximum value which is a maximum value of all tiles of the input data; determine, by the adder-subtractor, a resulting value obtained by subtracting, from the first maximum value, a second maximum value detected row-wise from the input data; determine, by the exponent processor, a second exponentiated value of a resulting value obtained by subtracting the second maximum value from the first maximum value; and determine, by the multiplication and division operator, a second sum value by applying the second exponentiated value corresponding to each tile of the input data to the first sum value and determine, to be the adjustment factor, a resulting value obtained by dividing the second exponentiated value by the second sum value.

The processor may be further configured to perform the second sub-softmax operation by applying the adjustment factor to the first exponentiated value.

In a general aspect, a processor-implemented method includes determining resulting data from input data by performing an inference on the input data by implementing a transformer model comprising a plurality of encoders and a plurality of decoders, wherein the determining of the resulting data comprises: determining an attention value from each of the plurality of encoders and the plurality of decoders, wherein the determining of the attention value comprises: performing a first sub-softmax tile-wise operation; performing a reduction operation to determine an adjustment factor based on a resulting value of the first sub-softmax tile-wise operation; and performing a second sub-softmax tile-wise operation based on a resulting value of the reduction operation.

The performing of the first sub-softmax tile-wise operation may include detecting a first maximum value tile-wise from the input data; determining a first exponentiated value of a resulting value obtained by subtracting the first maximum value from each value of the input data; and determining a first sum value of the first exponentiated value tile-wise.

The performing of the reduction operation may include determining a second exponentiated value of a resulting value obtained by subtracting, from the first maximum value, a second maximum value which is a maximum value of all tiles of the input data; determining a second sum value by applying, to the first sum value, the second exponentiated value corresponding to each tile of the input data; and determining, to be the adjustment factor, a resulting value obtained by dividing the second exponentiated value by the second sum value.

The performing of the second sub-softmax operation may include applying the adjustment factor to the first exponentiated value.

The reduction operation may be performed by a reduction operator comprising a comparator, an adder-subtractor, an exponent processor, a multiplication and division operator, and a memory.

In a general aspect, a processor-implemented method includes determining target data from input data by performing a transformer-based inference operation on the input data; wherein the determining of the target data comprises: performing, by a processor of an electronic device, a first matrix operation on input data based on a query and a key; performing, by the processor, a scaling operation and a masking operation on a resultant value of the first matrix operation; performing, by the processor, a first sub-softmax tile-wise operation; performing, by the processor, a reduction operation to determine a scale factor based on a result of the first sub-softmax tile-wise operation; and performing, by the processor, a second sub-softmax tile-wise operation based on a resulting of the reduction operation, wherein the first matrix operation and the first sub-softmax operation are configured to have a same data reading unit and a same data reading order.

The second sub-softmax operation may be performed by applying an adjustment factor obtained by the reduction operation to a first exponentiated value obtained by the first sub-softmax tile-wise operation.

The method may include performing a second matrix tile-wise operation based on a resulting value of the second sub-softmax operation and a given data value, wherein the second matrix operation is a matrix multiplication between the resulting value of the second sub-softmax operation and a value mapped to the key.

Other features and aspects will be apparent from the following detailed description, the drawings, and the claims.

BRIEF DESCRIPTION OF DRAWINGS

FIG. 4 illustrates an example of processing performed in an attention block, in accordance with one or more embodiments.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
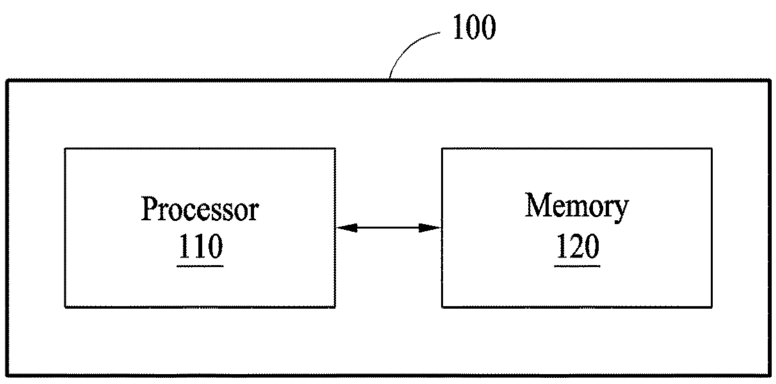
FIG. 1 illustrates an example configuration of an example electronic device configured to perform an inference with an example transformer model, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Additionally, in the description of example embodiments, detailed description of structures that are thereby known after an understanding of the disclosure of the present application may be omitted when it is deemed that such description may cause ambiguous interpretation of the example embodiments.

Example embodiments described herein may be implemented by hardware, or a combination of hardware and instructions (e.g., code or program software) that optimizes a softmax operation of a transformer model, and may be, or applied to, a graphics processing unit (GPU) or an accelerator to implement machine learning. The example embodiments may be, or applied to, as non-limiting examples, a data center, a cloud environment, a mobile system, or an embedded system that may provide services such as, but not limited to, natural language processing (NLP), translation, and question and answer (Q&A) with a server. Various aspects of the transformer model described herein may be applicable for implementation in various existing transformer-based network models. Although the example embodiments will be described hereinafter mainly in connection with an inference process using the transformer model, the example embodiments may also be applicable to a training process. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

FIG. 1 illustrates an example configuration of an example electronic device configured to perform an inference by implementing a transformer model, in accordance with one or more embodiments.

Referring to FIG. 1, an example electronic device 100 may generate resulting data or target data, by performing an inference on given input data by implementing a transformer model. The electronic device 100 may be one of various types. The electronic device 100 may include, as non-limiting examples, a portable communication device (e.g., a smartphone), a computing device, a portable multimedia device, a portable medical device, a camera, a wearable device, a home appliance, or a server. However, the electronic device 100 is not limited to the foregoing examples.

The electronic device 100 may include a processor (e.g., one or more processors) 110 and a memory 120. The processor 110 may execute, for example, instructions (e.g., coding), to control at least one other component (e.g., a hardware component or hardware plus code or program software instruction component) of the electronic device 100, and may perform various data processing or other operations, as non-limiting examples. In an example, as at least a portion of the data processing or other operations, the processor 110 may store instructions or data in the memory 120, process the instructions or data stored in the memory 120, and store resulting data obtained therefrom in the memory 120. In an example, the processor 110 may include, a main processor (e.g., a central processing unit (CPU) or an application processor (AP)) or an auxiliary processor (e.g., a graphics processing unit (GPU), a neural processing unit (NPU), an image signal processor (ISP), a sensor hub processor, or a communication processor (CP)) that is operable independently of or in conjunction with the main processor. For example, when the electronic device 100 includes a main processor and an auxiliary processor, the auxiliary processor may be set to use less power than the power of the main processor, or may be specialized in a specified function. The auxiliary processor may be implemented separate from, or as a portion of, the main processor.

The memory 120 may store therein instructions that are executed by one or more components (e.g., the processor 110) of the electronic device 100 and various data to be used by the components. The data may include, as non-limiting example, the instructions, input data or output data for a related instruction, and data of the transformer model. The memory 120 may include, as non-limiting examples, a volatile memory such as a random-access memory (RAM), a dynamic RAM (DRAM), and a static RAM (SRAM), and/or a non-volatile memory such as a flash memory.

The processor 110 may control an overall operation of the electronic device 100, and may perform one or more operations described herein. In an example, the processor 110 may perform an inference by implementing a transformer model including a plurality of encoders and a plurality of decoders. Each of the encoders and decoders may include an attention block that determines an attention value. In an example, the term "attention" described herein may indicate self-attention that performs attention on itself. For example, self-attention may indicate determining a similarity between words in an input sentence to be an attention value, and an attention value derived through self-attention may indicate to what extent each word is associated with another word in the sentence. The attention value may indicate a probability value that a specific element (e.g., a specific word in the input sentence) of input data is associated with another element (e.g., another word in the input sentence).

A softmax operation may be performed in the attention block. The softmax operation may be performed by the processor 110 of, as examples, a GPU or an accelerator. The processor 110 may decompose or fission the softmax operation performed in the attention block into a plurality of operations that may be fused with matrix operations performed before and after the respective softmax operations. The processor 110 may decompose the softmax operation using a product rule of exponents such that the softmax operation may be processed in the same unit and the same order as a corresponding matrix operation. The processor 110 may reduce a softmax processing time, an amount of memory access, and resource consumption (e.g., power consumption) by fusing the decomposed softmax operations with the matrix operations before and after the respective softmax operations.

A matrix operation performed each before and after a softmax operation may include a matrix multiplication performed tile-wise. The processor 110 may adjust the softmax operation such that the softmax operation includes an operation process available for the tile-wise matrix operation, and perform the adjusted softmax operation in conjunction with the corresponding matrix multiplication. The processor 110 may thereby reduce the number and amount of memory access to read and store data. Typically, the softmax operation may be performed row-wise, and may be performed independently of a matrix multiplication performed tile-wise, and thus the softmax operation and the matrix multiplication may desire independent data reading and data storing processes, which may increase the number and amount of memory access. However, in an example, the processor 110 may reduce a total number and amount of access to the memory 120 by transforming the existing softmax operation into a tile-wise operation and performing the softmax operation in conjunction with a matrix multiplication performed before and/or after the softmax operation.

In an example, the processor 110 may perform the existing softmax operation in the attention block of the transformer model by decomposing the softmax operation into a first sub-softmax operation, a reduction operation, and a second sub-softmax operation. The processor 110 may perform the first sub-softmax operation in a tile-wise manner, perform the reduction operation to determine an adjustment factor (or a scale factor) based on a resulting value of the first sub-softmax operation, and perform the second sub-softmax operation in a tile-wise manner based on a resulting value of the reduction operation.

In an example, the processor 110 may perform a first matrix operation based on a query and a key, and perform the first sub-softmax operation in a tile-wise manner based on a resulting value of the first matrix operation. In an example, the first matrix operation and the first sub-softmax operation may have the same data reading unit and the same data reading order. The processor 110 may perform a scale and mask operation on the resulting value of the first matrix operation, and perform the first sub-softmax operation in a tile-wise manner based on a resulting value obtained after the scale and mask operation. The first sub-softmax operation performed by the processor 110 may include detecting a first maximum value tile-wise from input data, determining a first exponentiated value of a resulting value obtained by subtracting a corresponding first maximum value from each value of the data, and determining a first sum value for the first exponentiated value tile-wise.

The reduction operation performed by the processor 110 may include determining a second exponentiated value of a resulting value obtained by subtracting a second maximum value that is a maximum value of all tiles of the data from the first maximum value determined by the first sub-softmax operation, and determining, to be the adjustment factor, a resulting value obtained by dividing the second exponentiated value by the second sum value. In various examples, the reduction operation may be performed by a separate hardware device (e.g., a reduction operator 850 of FIG. 8) including a comparator, an adder-subtractor, an exponent processor, a multiplication and division operator, and a memory.

The processor 110 may perform the second sub-softmax operation by applying the adjustment factor obtained by the reduction operation to the first exponentiated value obtained by the first sub-softmax operation. The processor 110 may perform a second matrix tile-wise operation based on a resulting value of the second sub-softmax operation and a given data value. The second matrix operation may be a matrix multiplication between the resulting value of the second sub-softmax operation and a value mapped to the key. A resulting value of a matrix multiplication may be determined to be an attention value. The second sub-softmax operation and the second matrix operation may have the same data reading order and the same data reading unit.

In an example, when the transformer model processes a sentence in natural language processing (NLP), a self-attention process may occupy most of the performance (or execution) time. Of the process, a non-matrix multiplication which is not a matrix multiplication may occupy a large portion of the performance time. This is because such a non-matrix multiplication operation is memory-intensive and may desire frequent memory access, and thus may be allocated more time to process data movements. Additionally, there may be a limit in the increase of a bandwidth of an off-chip memory such as a DRAM due to restrictions by manufacturing costs or the device's physical environments (e.g., the size of an area and the number of pins), and thus the memory-intensive non-matrix multiplication operation in the transformer model may occupy a large portion of the processing time due to a bandwidth bottleneck. The processor 110 may decompose the memory-intensive non-matrix multiplication operation (e.g., the existing softmax operation) into the foregoing sub-operations (e.g., the first sub-softmax operation, the reduction operation, and the second sub-softmax operation), and fuse them with a compute-intensive matrix multiplication operation performed before and/or after them, thereby minimizing the memory access.

The operations of the transformer model described above may be performed in the same manner in a training (or learning) process of the transformer model in addition to an inference process.

Figure 2:
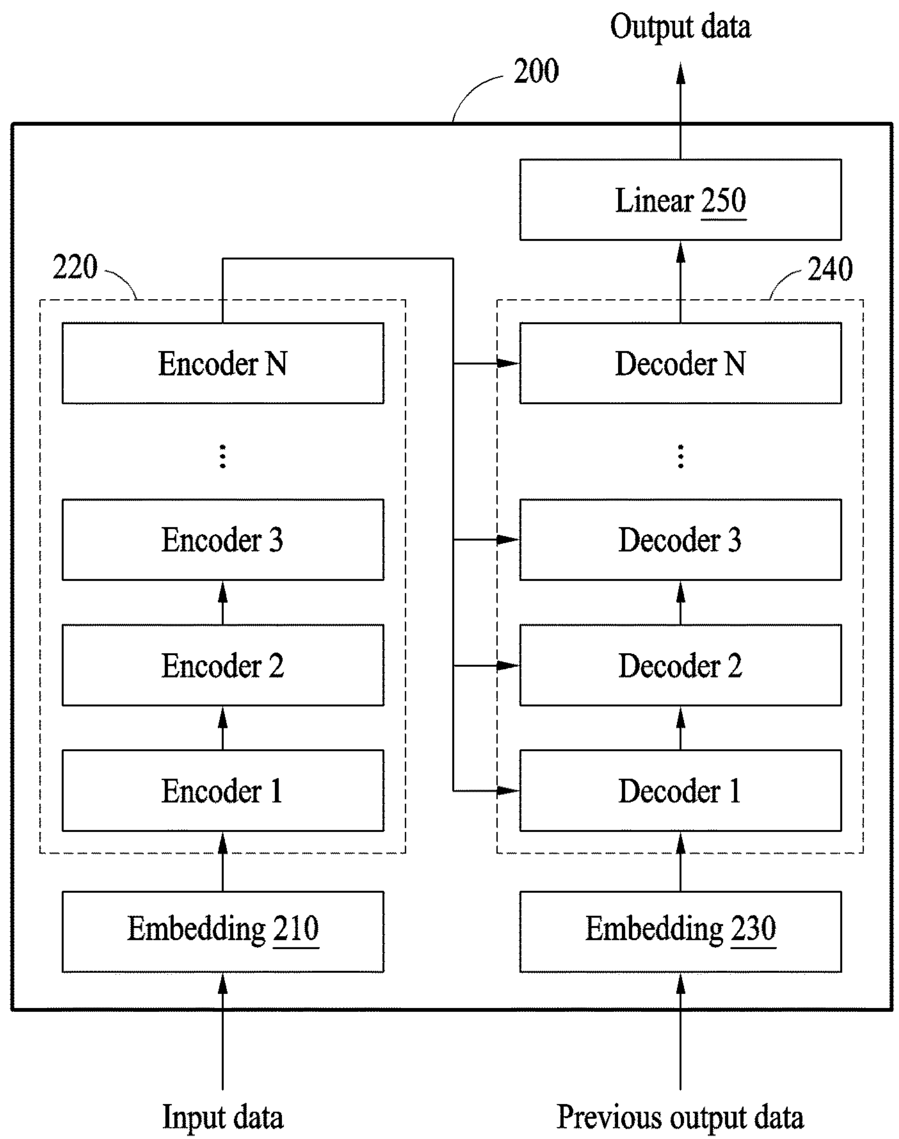
FIG. 2 illustrates an example configuration of an example transformer model, in accordance with one or more embodiments.

FIG. 2 illustrates an example configuration of a transformer model, in accordance with one or more embodiments.

Referring to FIG. 2, an example transformer model 200 may perform an inference on given input data and provide output data. The transformer model 200 may determine output data of a current time based on the input data and based on output data of a previous time. The output data of the current time may also be referred to herein as current output data, and the output data of the previous time may also be referred to herein as previous output data.

The transformer model 200 may include a plurality of stacked encoders 220 and a plurality of stacked decoders 240. In a non-limited example, the transformer model 200 may be a hardware structure in which the encoders 220 and the decoders 240, which may have self-attention as a basic block, are respectively stacked. However, this is only an example, and the encoders 220 and the decoders 240 may be structured in a different manner. The encoders 220 may include N encoders, and the decoders 240 may include N decoders. N is a natural number greater than or equal to 2. The encoders 220 and the decoders 240 may be implemented, respectively, in a form in which the same layer is repeated N times.

In an example, a first encoder (e.g., encoder 1) among the encoders 220 may receive an embedding vector of input data derived by embedding 210, and a first decoder (e.g., decoder 1) among the decoders 240 may receive an embedding vector of previous output data derived by encoding 230. In this example, the input data and the previous output data may be, as a non-limiting example, a specific word or sentence. A positional encoding value may be added to the embedding vector before the embedding vector is input to encoder 1 and decoder 1. The positional encoding value may be used to provide position information associated with a position of a word in a sentence.

The encoders 220 may sequentially perform layer operations corresponding to the total number of encoders 220, and then individually transmit an output value of the last encoder (e.g., encoder N) to the respective decoders 240. Subsequently, the decoders 240 may also perform layer operations corresponding to the total number of decoders 240, and the output value transmitted from the encoder N may be used whenever each operation is performed. An output value from the last decoder N may be linearly transformed by a linear process 250, and output data may be determined based on the linearly transformed value.

The configuration of the transformer model 200 illustrated in FIG. 2 is provided merely as an example, and thus a configuration of a transformer model may vary, and the scope of examples thereof is not limited by the illustrated configuration of the transformer model 200.

Figure 3A:
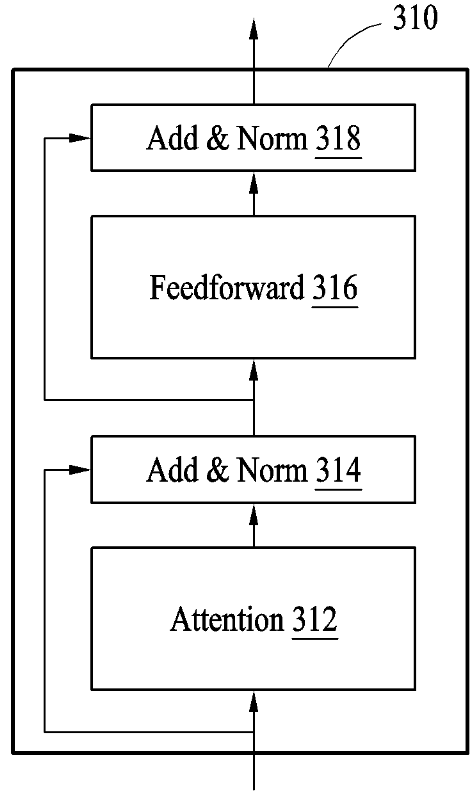
FIG. 3A illustrates an example configuration of an example encoder, in accordance with one or more embodiments.

FIG. 3A illustrates an example configuration of an example encoder, in accordance with one or more embodiments.

Referring to FIG. 3A, an encoder 310 may correspond to any one of the encoders 220 of the transformer model 200 illustrated in FIG. 2. The encoder 310 may include an attention block 312, add and norm (Add & Norm as illustrated) blocks 314 and 318, and a feedforward block 316. In an example, when the encoder 310 is implemented as a layer of a neural network, the encoder 310 may include a first sub-layer that corresponds to the attention block 312 and a second sub-layer that corresponds to the feedforward block 316.

The attention block 312, that determines an attention value, may correspond to multi-head self-attention. The multi-head self-attention may indicate performing self-attention operations in parallel. A self-attention operation may indicate performing an attention operation on itself, and the attention operation may indicate obtaining an attention value. The feedforward block 316 may correspond to a general feedforward neural network. The add and norm blocks 314 and 318 may perform a residual connection operation that adds an input and an output to each other, and may perform a layer normalization operation that performs normalization using an average and a variance.

In an example, the attention block 312 may determine a similarity to each of all keys for a given query, and apply the determined similarity as a weight to each value mapped to a corresponding key. The attention block 312 may calculate a weighted sum to which the similarity is applied and provide it as an attention value. The query, the key, and the value described above may be, for example, vectors of all words in an input sentence. In the self-attention performed by the attention block 312, a similarity between the words in the input sentence may be calculated, and thus a probability that a specific word is associated with another word in the sentence may be determined.

Figure 3B:
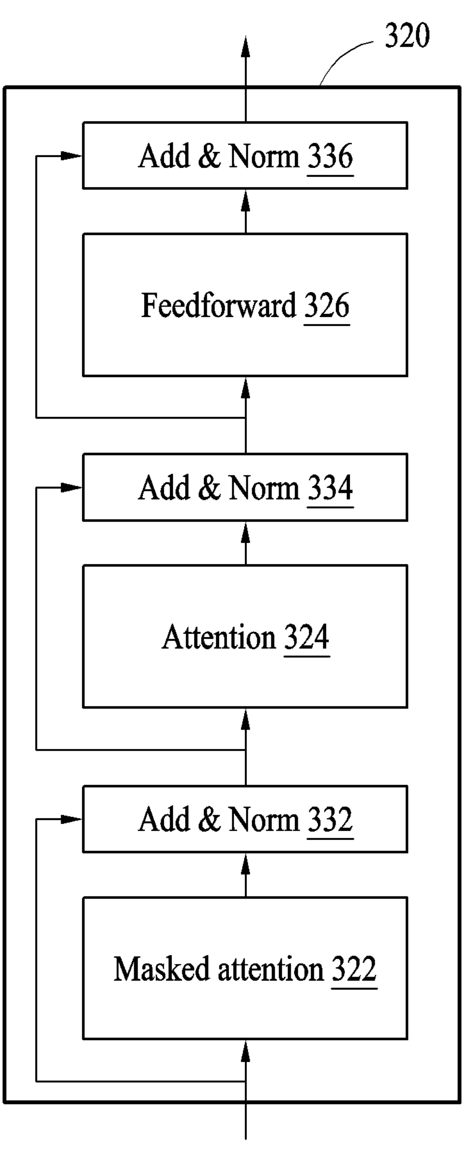
FIG. 3B illustrates an example configuration of an example decoder, in accordance with one or more embodiments.

FIG. 3B illustrates an example configuration of an example decoder, in accordance with one or more embodiments.

Referring to FIG. 3B, in an example, a decoder 320 may correspond to any one of the decoders 240 of the transformer model 200 illustrated in FIG. 2. Similar to the encoder 310 of FIG. 3A, the decoder 320 may include blocks to perform a self-attention operation and a feedforward operation. The decoder 320 may include a masked attention block 322, add and norm (Add & Norm as illustrated) blocks 332, 334, and 336, an attention block 324, and a feedforward block 326. In an example, when the decoder 320 is implemented as a layer of a neural network, the decoder 320 may include a first sub-layer that corresponds to the masked attention block 322, a second sub-layer that corresponds to the attention block 324, and a third sub-layer that corresponds to the feedforward block 316.

The masked attention block 322 and the attention block 324 may determine an attention value and may correspond to multi-head attention. The multi-head attention may indicate performing attention operations in parallel. In an example, the masked attention block 322 and the attention block 324 may perform a same operation as the attention block 312 of FIG. 3A. However, the masked attention block 322 may be different from the attention block 324 in that masking may be applied to an attention score matrix. The masking may prevent reference to a word at a future point in advance of its own word in the attention score matrix. In the attention block 324, a self-attention operation may be performed.

In an example, the feedforward block 326 may correspond to a typical feedforward neural network. The add and norm blocks 332, 334, and 336 may perform a residual connection operation that adds an input and an output to each other and performs a layer normalization operation that performs normalization by implementing an average and a variance.

FIG. 4 illustrates an example of processing performed in an attention block, in accordance with one or more embodiments.

Referring to FIG. 4, reference numeral 410 illustrates a process that is performed in a typical attention block 422, and reference numeral 440 illustrates a process that is performed in an attention block 452, in one or more examples. In an example, the process performed in the attention block 452 may be performed by the processor 110 of FIG. 1.

In the typical attention block 422, attention operations may be performed in parallel according to a multi-head structure 420, and operations may be performed in an order of a first matrix operation block 432, a scale block 434, a mask block 436, a softmax block 438, and a second matrix operation 439. In the first matrix operation block 432, a matrix multiplication based on a query and a key may be performed. In the second matrix operation block 439, a matrix multiplication based on a value mapped to the key, and on a resulting value of the softmax block 438, may be performed. In the scale block 434, a scaling operation that adjusts the size of an output value of the first matrix operation block 432 may be performed. In the mask block 436, masking to avoid or prevent the acquisition of an attention with a future value including its own value may be performed. In the softmax block 438, a similarity may be calculated based on a value output from the mask block 436. In the second matrix operation block 439, an attention value may be determined through a matrix multiplication between the value mapped to the key and a corresponding similarity.

In the attention block 452 of the one or more examples, attention operations may be performed in parallel according to a multi-head structure 450. In the attention block 452, an operation performed in the typical softmax block 438 may be decomposed into operations to be performed respectively in a first sub-softmax block 466, a reduction block 470, and a second sub-softmax block 482, and may then be performed therein.

The processing in the attention block 452 may be largely divided into a first operation process 460 including operations in a first matrix operation block 462, a scale and mask block 464, and the first sub-softmax block 466, a second operation process including an operation in the reduction block 470, and a third operation process 480 including operations in the second sub-softmax block 482 and a second matrix operation block 484.

In the first matrix operation block 462, a matrix multiplication based on a query and a key may be performed. In the scale and mask block 464, a scaling operation and masking operation may be applied to a resulting value of the matrix multiplication. In an example, the scaling operation and the masking operation may each be processed elementwise, and may thus be fused with operations before and/or after them to be processed. This is because operations processed elementwise may not be affected by a data reading order and a data reading unit. The scaling operation and the masking may be fused with an operation of the first matrix operation block 462 by the application of layer fusion.

In the first sub-softmax block 466, a first maximum value may be detected in a tile-wise operation, and a first sum value of an exponentiated value may be determined in a tile-wise operation. In the reduction block 470, an adjustment factor may be determined based on a resulting value of the first sub-softmax block 466. In the second sub-softmax block 482, the adjustment factor determined in the reduction block 470 may be applied to the resulting value of the first sub-softmax block 466, and a resulting value of the softmax operation may be determined in a tile-wise operation. In the second matrix operation block 484, a matrix multiplication between a resulting value of the second sub-softmax operation and a value mapped to the key may be performed, and an attention value may be determined through this matrix multiplication. The operations performed in the first sub-softmax block 466, the reduction block 470, and the second sub-softmax block 482 will be described in more detail below.

Figure 5:
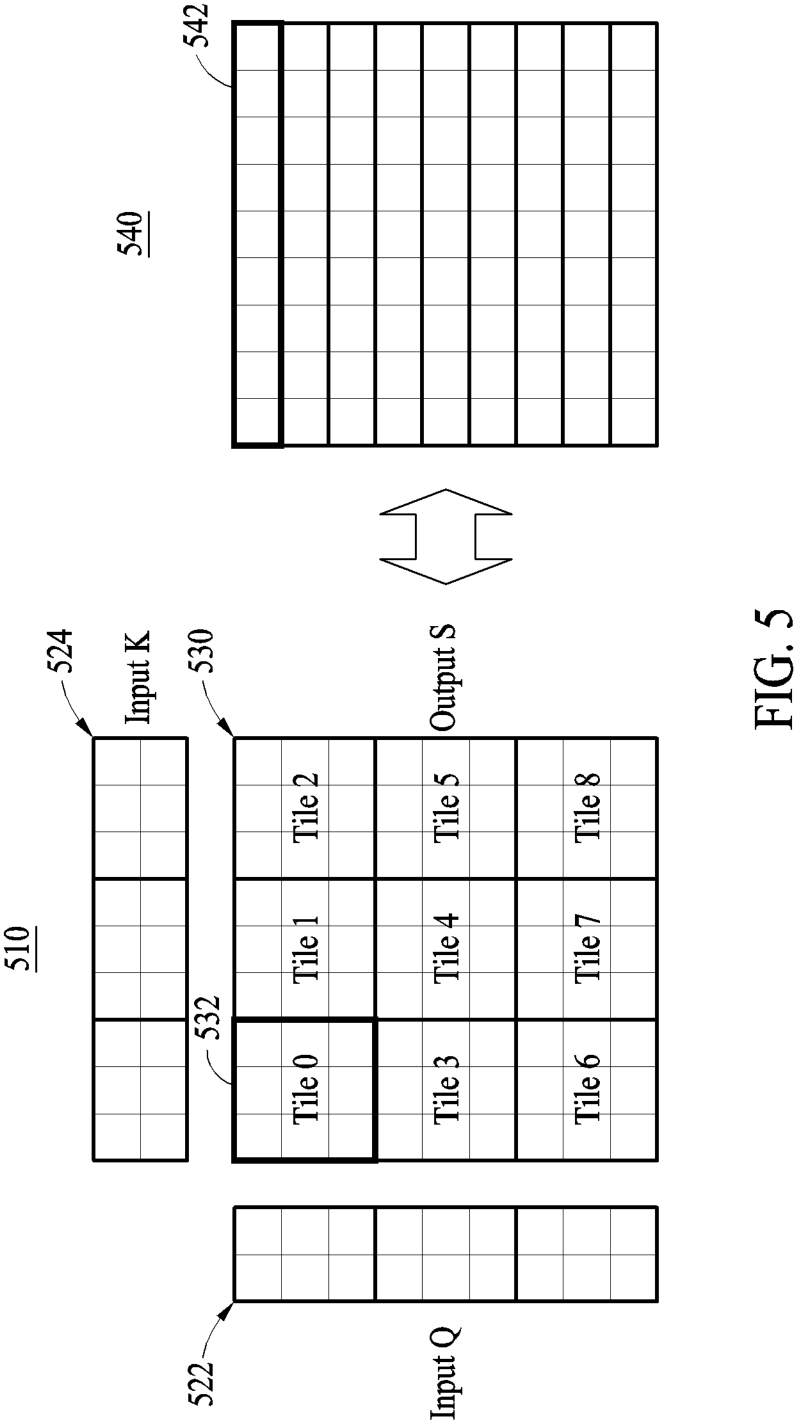
FIG. 5 illustrates an example comparison between a matrix multiplication and a typical softmax operation, in accordance with one or more embodiments.

FIG. 5 illustrates an example comparison between a matrix multiplication and a typical softmax operation, in accordance with one or more embodiments.

Referring to FIG. 5, reference numeral 510 illustrates a matrix multiplication (e.g., a first matrix operation), and reference numeral 540 illustrates a typical softmax operation. In the matrix multiplication 510, a matrix output S 530 in a tile form may be determined by a multiplication between a matrix input Q 522 in a tile form and a matrix input K 524 in a tile form. In an example, a matrix output 532 corresponding to tile 0 in the matrix output S 530 may be calculated as represented by Equation 1 below.

$$\begin{pmatrix} S_{00}, S_{01}, S_{02} \\ S_{10}, S_{11}, S_{12} \\ S_{20}, S_{21}, S_{22} \end{pmatrix} = \begin{pmatrix} Q_{00}, Q_{01} \\ Q_{10}, Q_{11} \\ Q_{21}, Q_{22} \end{pmatrix} \times \begin{pmatrix} K_{00}, K_{01}, K_{02} \\ K_{10}, K_{11}, K_{12} \end{pmatrix} \quad \text{Equation 1}$$

In Equation 1 above, $Q_{00}$ through $Q_{22}$ are matrix elements corresponding to tile 0 of the matrix output S 530 in the matrix input Q 522, and $K_{00}$ through $K_{12}$ are matrix elements corresponding to tile 0 of the matrix output S 530 in the matrix input K 524. $S_{00}$ through $S_{22}$ are matrix elements of the matrix output S 532 corresponding to tile 0 obtained by a matrix multiplication between the matrix input Q 522 and the matrix input K 524. For the matrix multiplication, the operation may be performed by tiling both a height and a width of a matrix to be values of a constant form.

In the typical softmax operation, data processing may be performed in a row-wise operation, for example, in a row unit 542, not by a multiplication between matrices. In an example, an operation of obtaining a maximum value among all values included in one row and then obtaining a sum value of the values included in the row may be performed.

As described above, the matrix multiplication that processes data in a tile-wise operation and the typical softmax operation that processes data in a row-wise operation may differ from each other in a data processing unit and order, and thus the operations may not be performed in conjunction with each other. Thus, in the example of FIG. 4, the operation in the typical softmax block 438 may not be performed in conjunction with the matrix multiplication performed tile-wise in the first matrix operation block 432 or the second matrix operation block 439.

As to be described later in detail with reference to FIG. 6, in accordance with one or more embodiments, a typical softmax operation may be decomposed (fission) into three operations (e.g., a first sub-softmax operation, a reduction operation, and a second sub-softmax operation), and may then be fused (fusion) with different matrix multiplication operations. Although only three operations, a first sub-softmax operation, a reduction operation, and a second sub-softmax operation, are discussed, this is only an example, and additional operations may be implemented.

Thus, non-matrix multiplication operations performed in an attention block of a transformer model may be processed in conjunction with a matrix multiplication operation through fusion.

Figure 6:
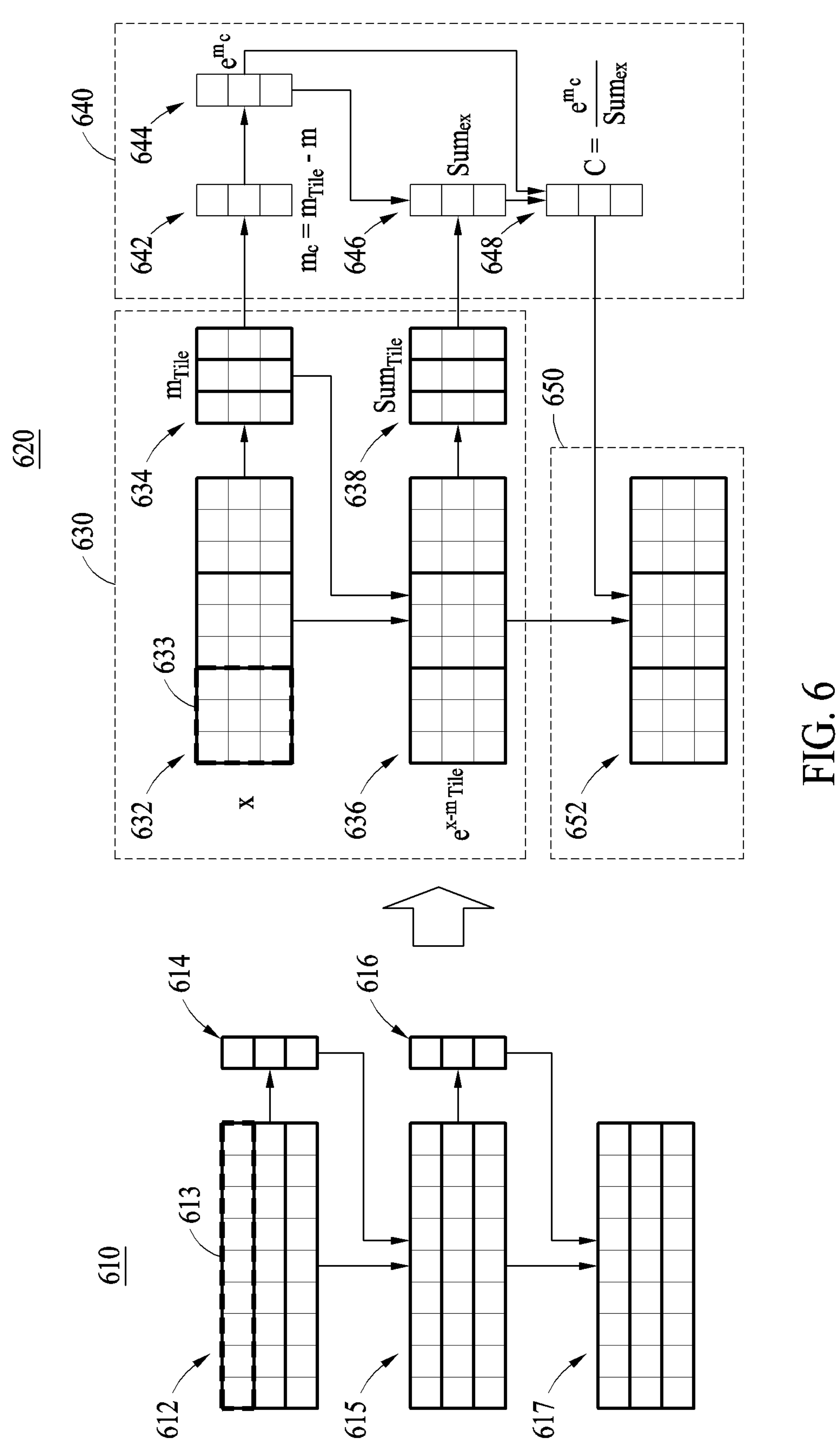
FIG. 6 illustrates an example softmax operation, in accordance with one or more embodiments.

FIG. 6 illustrates an example softmax operation, in accordance with one or more embodiments.

Referring to FIG. 6, a process of performing a typical softmax operation 610 and a process of performing a proposed example softmax operation 620 are illustrated. In the process of performing the typical softmax operation 610, data processing may be performed in a row-wise operation (e.g., in a row unit 613) on input data x 612 which is a target to be processed, and a maximum value m 614 may be derived from among all values included in the row unit 613. The values included in the input data x 612 may be vector values or feature values. Subsequently, exponentiation may be performed on a resulting value obtained by subtracting the maximum value m 614 from each of the values of the input data x 612, and exponentiated data $e^{x-m}$ 615 may be generated. Subsequently, data processing may be performed row-wise on the exponentiated data $e^{x-m}$ 615, and a sum value 616 of all exponentiated values included in each row unit may be determined. Subsequently, normalization may be performed on the exponentiated data $e^{x-m}$ 615 based on the sum value 616, and normalized resulting data 617 may be determined. Such a typical softmax operation may be represented by Equation 2 below.

$$\text{Softmax}(x) = \frac{e^{x-m}}{\sum_{k=0}^{N-1} e^{x_k - m}} \quad \text{Equation 2}$$

$$m: \text{Max}(x_k),\ k \in \{0, 1, 2, \ldots, N-1\}$$

In Equation 2, Softmax(x) denotes a resulting value of a softmax operation on input data x, and N denotes the number of elements (or element values) included in one row of the input data x. Max($x_k$) denotes a maximum value m corresponding to a kth value $x_k$. In an example, all of the values included in the row may have the same corresponding maximum value. As represented by Equation 2 above, the typical softmax operation 610 may be performed row-wise in terms of a data reading order and data reading unit.

Dissimilar to the typical softmax operation 610 performed in a row-wise operation, the proposed softmax operation 620 may be performed tile-wise to be performed in conjunction (or fusion) with matrix multiplication operations performed before and/or after a softmax operation. The typical softmax operation represented by Equation 2 above may be decomposed as represented by Equation 3 below by implementing a product rule of exponents. Through this decomposition, a processing process may be changed to read or retrieve data in the same reading order and the same reading unit as the matrix multiplication operations, which may allow the softmax operation to be performed in conjunction with the matrix multiplication operations performed tile-wise.

$$\text{Softmax}(x) = \frac{e^{x-m_{Tile}} \times e^{m_{Tile}-m}}{\sum_{i=0}^{\#\,Tile-1}\left(e^{(m_{Tile})_i - m} \times \left(\sum_{k=0}^{Tile\,Size-1} e^{x_k - (m_{Tile})_i}\right)_i\right)} \quad \text{Equation 3}$$

$$(m_{Tile})_i: \text{Max}(x_k),\ k \in \{0, 1, 2, \ldots, \text{Tile Size}-1\} \text{ for } ith \text{ tile}$$

As described above, the softmax operation 620 may be performed by being decomposed into a first sub-softmax operation 630, a reduction operation 640, and a second sub-softmax operation 650. The first sub-softmax operation 630 may correspond to detection of a maximum value and a sum value in the softmax, and the second sub-softmax operation 650 may correspond to normalization.

Referring to FIG. 6, in the first sub-softmax operation 630, data processing may be performed by a tile-wise operation (e.g., in a tile unit 633), on input data x 632. In an example, the size (e.g., the number of elements forming the width of a tile) of the tile unit 633 on which the data processing is performed may correspond to TileSize in Equation 3 above. A first maximum value $m_{tile}$ 634 may be detected tile-wise from the input data x 632, and a first exponentiated value $e^{x-mTile}$ 636 obtained by exponentiating x-$m_{Tile}$ that is a resulting value obtained by subtracting a corresponding first maximum value $m_{tile}$ 634 from each value of the input data x 632 may be determined. Subsequently, a first sum value $\text{Sum}_{Tile}$ 638 for the first exponentiated value $e^{x-mTile}$ 636 may be determined tile-wise. The first sum value $\text{Sum}_{Tile}$ 638 may correspond to $$\left(\sum_{k=0}^{TileSize-1} e^{x_k-(m_{Tile})_i}\right)_i$$

in Equation 3 above.

In the reduction operation 640, $m_c$ 642, which is a resulting value obtained by subtracting a second maximum value m that is a maximum value for all tiles of the input data x 632 from the first maximum value $m_{Tile}$ 634 determined in the first sub-softmax operation 630, may be obtained, and a second exponentiated value $e^{m_c}$ 644 may be determined by exponentiating $m_c$ 642. A second sum value $\text{Sum}_{ex}$ 646 may be determined by a matrix multiplication between the first sum value $\text{Sum}_{Tile}$ 638 derived from the first sub-softmax operation 630 and the second exponentiated value $e^{m_c}$ 644, and a resulting value C 648 obtained by dividing the second exponentiated value $e^{m_c}$ 644 by the second sum value $\text{Sum}_{ex}$ 646 may be determined to be an adjustment factor. The adjustment factor C 648 may be represented by Equation 4 below, which corresponds to a portion of Equation 3 above.

$$C = \frac{e^{m_{Tile}-m}}{\sum_{i=0}^{\#\,Tile-1}\left(e^{(m_{Tile})_i - m} \times \left(\sum_{k=0}^{Tile\,Size-1} e^{x_k - (m_{Tile})_i}\right)_i\right)} \quad \text{Equation 4}$$

In the second sub-softmax operation 650, a final resulting value Softmax(x) 652 of the softmax operation may be determined by multiplying the first exponentiated value $e^{x-mTile}$ 636 obtained in the first sub-softmax operation 630 by the adjustment factor C 648 obtained in the reduction operation 640.

By implementing a softmax operation as represented by Equation 3, a maximum value and a sum value may be obtained tile-wise. In the example of the typical softmax operation 610, data processing may be performed by a row-wise operation, and thus a softmax operation may not be fused with operations before and/or after the softmax operation. Thus, unnecessary data access may occur. In contrast, in the example of the proposed softmax operation 620, data may be processed in the same unit and the same order as operations before and/or after the softmax operation, and the softmax operation may be performed by being fused with the operations before and/or after it. Thus, unnecessary data access may be reduced, and the performance (or execution) time may be reduced. As the unnecessary data access and the performance time are reduced, energy consumption may thus be reduced.

Figure 7:
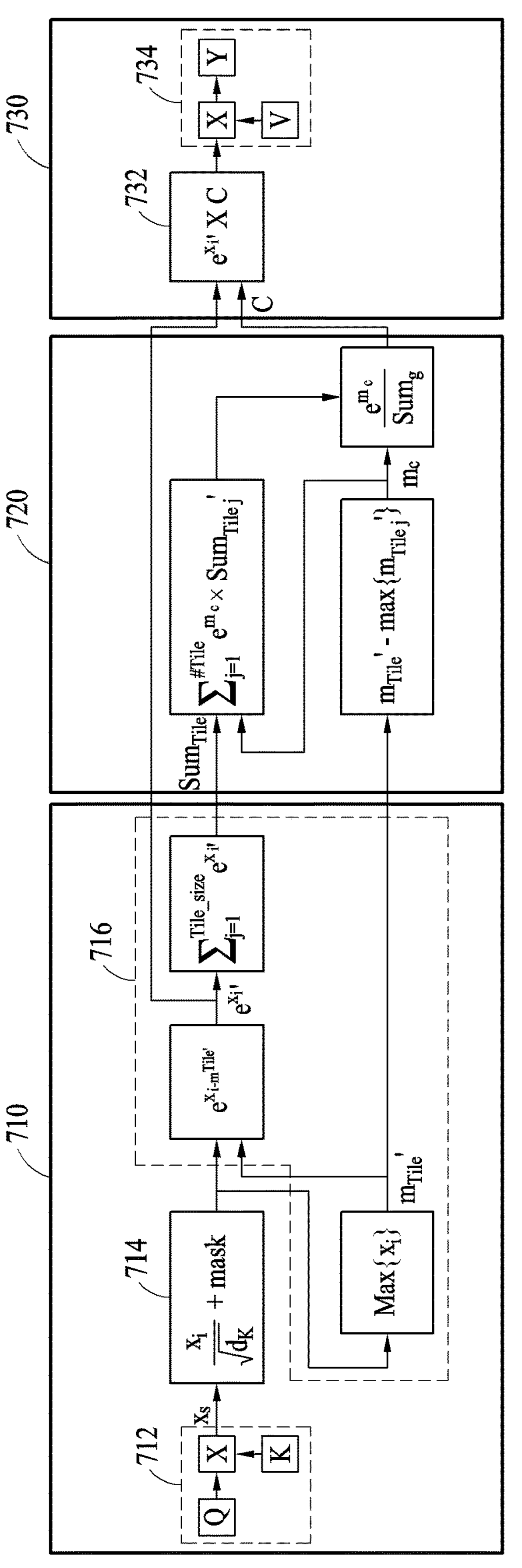
FIG. 7 illustrates an example of processing performed in an attention block including a softmax operation, in accordance with one or more embodiments.

FIG. 7 illustrates an example of processing performed in an attention block including a softmax operation, in accordance with one or more embodiments.

Referring to FIG. 7, a processing process performed in an attention block may be divided into a first operation process 710, a second operation process 720, and a third operation process 730. In an example, the first operation process 710 may include a first matrix operation 712, a scale and mask operation 714, and a first sub-softmax operation 716. In an example, the second operation process 720 may correspond to a reduction operation process. In an example, the third operation process 730 may include a second sub-softmax operation 732 and a second matrix operation 734. In the first operation process 710, the scale and mask operation 714 may be connected to (or fused with) the first matrix operation 712 of a front end and the first sub-softmax operation 716. In the third operation process 730, the second sub-softmax operation 732 may be connected to (or fused with) the second matrix operation 734 of a back end.

Specifically, in the matrix operation 712 in the first operation process 710, a matrix multiplication between a query Q and a key K may be performed, and a result $X_s$ of the matrix multiplication may be obtained. Subsequently, the scale and mask operation 714 may be performed on $X_s$, and the first sub-softmax operation 716 may be performed based on a resulting value obtained by performing the scale and mask operation 714. The scale and mask operation 714 may be fused with the first sub-softmax operation 716. In the first sub-softmax operation 716, a first maximum value $m_{Tile}'$ may be detected by a tile-wise operation, and a first exponentiated value $$\left(e^{x_i - m'_{Tile}} - e^{x'_i}\right)$$

may be obtained by exponentiating a resulting value obtained by subtracting the first maximum value $m_{Tile}'$ from the result obtained from the scale and mask operation 714. The first maximum value $m_{Title}'$ may correspond to a single value that is greatest compared to values (e.g., feature values) in each tile. Subsequently, a first sum value $Sum_{Tile}$ of the first exponentiated value $$e^{x'_i}$$

may be determined by a tile-wise operation. The first sum value $Sum_{Tile}$ may correspond to a value obtained by adding exponentiated values of all the values in each tile. In the first operation process 710, the first sub-softmax operation 716 may directly use the results of the first matrix operation 712 and the scale and mask operation 714, and thus memory access for the storage of the result of the first matrix operation 712 and for the first sub-softmax operation 716 may not be necessary.

In the second operation process 720, a reduction operation may be performed. The reduction operation may be an operation of obtaining complete values from primarily processed partial values after being tiled. In the second operation process 720, a resulting value $m_c$ may be determined by subtracting, from the first maximum value $m_{Tile}'$ determine in the first sub-softmax operation 716, a second maximum value $\max\{m_{Tilej}'\}$ that is a maximum value of all tiles, and a second exponentiated value $$e^{m_c}$$

may be determined by exponentiating $m_c$. Subsequently, a second sum value $Sum_g$ may be determined by a matrix multiplication process between the first sum value $Sum_{Tile}$ derived from the first sub-softmax operation 630 and the second exponentiated value $$e^{m_c},$$

and a resulting value C obtained by dividing the second exponentiated value $$e^{m_c}$$

by the second sum value Sum may be determined to be an adjustment factor.

Specifically, in the second sub-softmax operation 732 in the third operation process 730, a final resulting value of the softmax operation may be determined by multiplying (e.g., a matrix multiplication) the first exponentiated value $$e^{x'_i}$$

obtained in the first sub-softmax operation 716 by the adjustment factor C obtained in the reduction operation. The second sub-softmax operation 732 may be fused with the second matrix operation 734 by normalizing data used in the second matrix operation 734. In the second matrix operation 734, an attention value Y may be determined by a matrix multiplication between the final resulting value (e.g., the resulting value of the second sub-softmax operation 732) of the softmax operation and a value V mapped to the key K used in the first matrix operation 712. In an example, the result of the second sub-softmax operation 732 may be directly used for the second matrix operation 734 without a separate storage process, and thus memory access may be reduced.

As described above, the first sub-softmax operation 716 and the second sub-softmax operation 732 may be performed by a tile-wise operation, and may thus be fused, respectively, with the first matrix operation 712 and the second matrix operation 734 that are performed by a tile-wise operation. This fusion may reduce memory access. A typical softmax operation may not be a tile-wise operation, and thus the first matrix operation 712, the second matrix operation 734, and the softmax operation of the typical softmax operation may independently desire data input and output processes. Thus, it may be desirable that the typical softmax operation have adequate memory access. However, by the proposed softmax operation, the fusion between the first matrix operation 712 and the first sub-softmax operation 716 and the fusion between the second sub-softmax operation 732 and the second matrix operation 734 may reduce data input and output requests and reduce memory access. The proposed softmax operation may reduce approximately by half the memory access compared to the typical softmax operation, and the reduction in the memory access may reduce a processing time and energy consumption.

Figure 8:
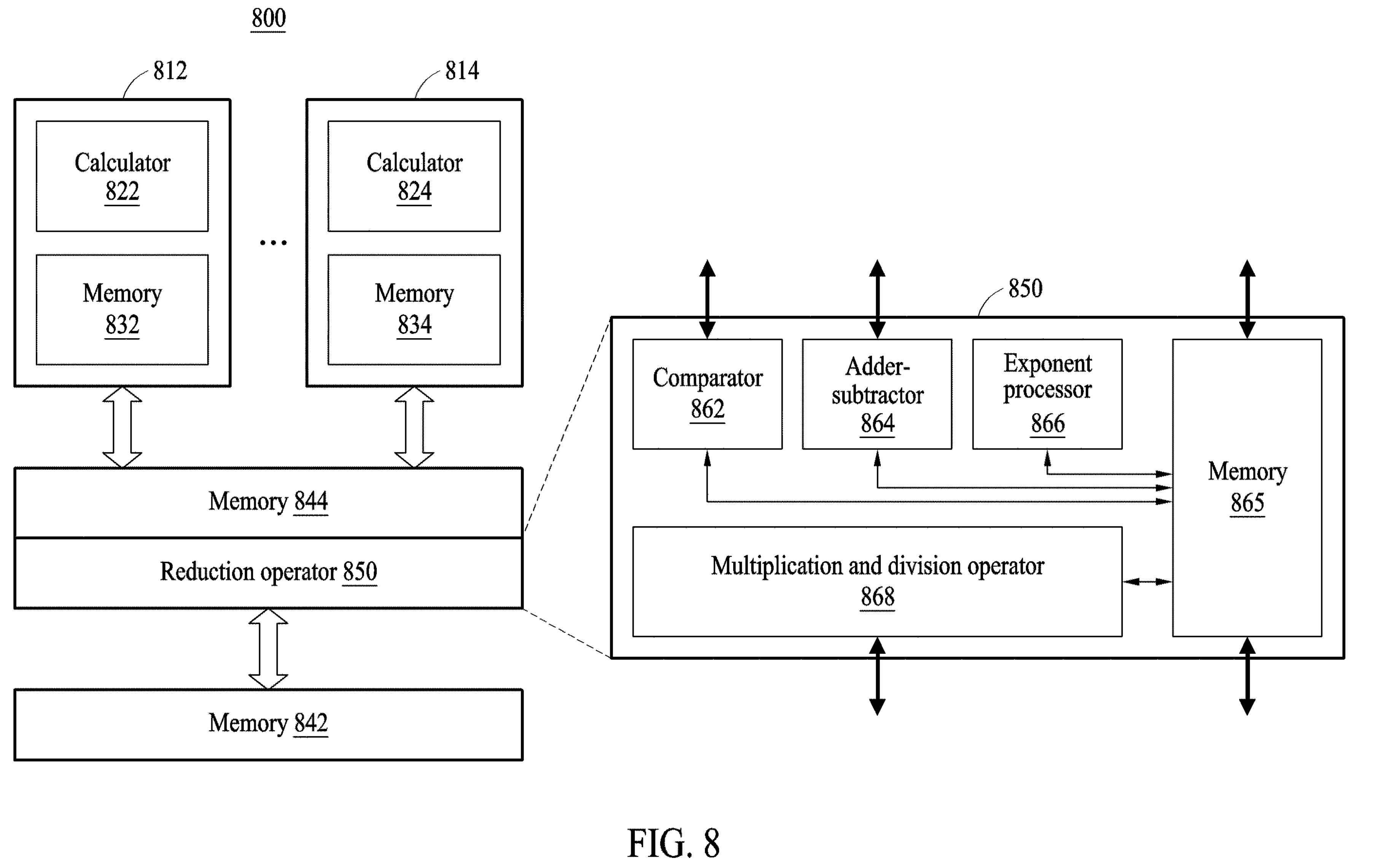
FIG. 8 illustrates an example configuration of an example reduction operator, in accordance with one or more embodiments.

FIG. 8 illustrates an example configuration of a reduction operator, in accordance with one or more embodiments.

Referring to FIG. 8, a softmax operation, in accordance with one or more embodiments, may be implemented for a multi-NPU structure such as, but not limited to, a GPU. An electronic device 800 may include a plurality of processors 812 and 814, memories 842 and 844, and a reduction operator 850. In an example, the processors 812 and 814 may have the multi-NPU structure or a multi-streaming processor (SM) structure, as only examples. The processors 812 and 814 may include calculators (or calculating processors) 822 and 824 and memories 832 and 834, respectively. In a non-limited example, the memories 832 and 834 may each be an SRAM or an L1 cache memory. In a non-limited example, the memory 844 may be an SRAM or an L2 cache memory, and the memory 842 may be a DRAM.

The processors 812 and 814 may perform a first sub-softmax operation by a tile-wise operation in an attention block of a transformer model. The processors 812 and 814 may perform the first sub-softmax operation by detecting a first maximum value from data by performing a tile-wise operation, determining a first exponentiated value of a resulting value obtained by subtracting a corresponding maximum value from each value of the data, and determining a first sum value of the first exponentiated value by a tile-wise operation.

In an example, a reduction operation may be performed by a separate hardware device such as the reduction operator 850. The reduction operator 850 may perform the reduction operation to determine an adjustment factor based on a resulting value of the first sub-softmax operation. The reduction operator 850 may include a comparator 862, an adder-subtractor 864, an exponent processor 866, and a multiplication and division operator 868, and a memory 865. The memory 865 may be an SRAM, and store therein values derived from the first sub-softmax operation.

The reduction operator 850 (e.g., the reduction circuitry) may read the first maximum value and the first sum value derived from the first sub-softmax operation from the memory 865, and detect a second maximum value that is a maximum value for all tiles through the comparator 862. The comparator 862 may be used to obtain a maximum value by comparing input values. The reduction operator 850 may determine a resulting value obtained by subtracting the second maximum value from the first maximum value through the adder-subtractor 864, and determine a second exponentiated value of a resulting value obtained by subtracting the second maximum value from the first maximum value through the exponent processor 866. Additionally, the adder-subtractor 864 may also be used to obtain a sum of exponentiated values, and the exponent processor 866 may be used for other exponent-related calculations. The reduction operator 850 may determine a second sum value by applying (e.g., a multiplication process) the second exponentiated value corresponding to each tile of the data to the first sum value through the multiplication and division operator 868, and determine, to be an adjustment factor, a resulting value obtained by dividing the second exponentiated value by the second sum value. Such a configuration of the reduction calculator 850 may be applied to a system (e.g., a GPU or an accelerator for machine learning) using a transformer-based model. Hereinafter, a type and order of operations performed by the reduction operator 850 will be described in more detail with reference to FIG. 9.

The processors 812 and 814 may perform a second sub-softmax tile-wise operation based on a resulting value of the reduction operation performed by the reduction operator 850. The processors 812 and 814 may perform the second sub-softmax operation by applying (e.g., multiplying) the adjustment factor derived from the reduction operation to the first exponentiated value derived from the first sub-softmax operation.

Figure 9:
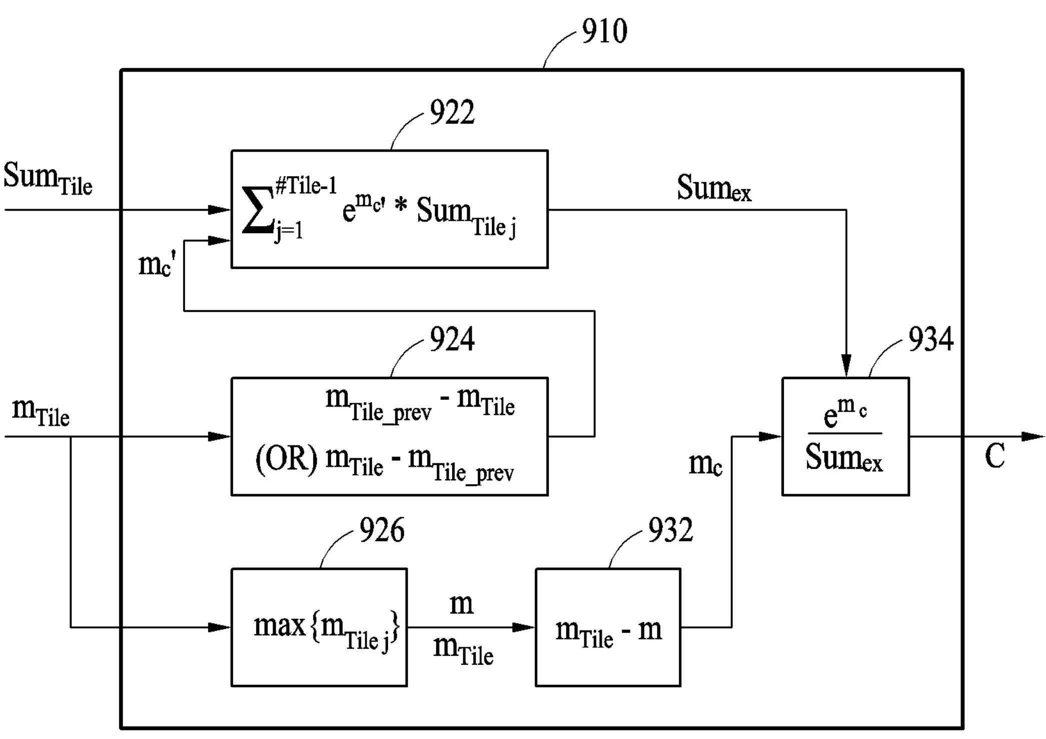
FIG. 9 illustrates an example reduction operation performed by an example reduction operator, in accordance with one or more embodiments.

FIG. 9 illustrates an example reduction operation performed by a reduction operator, in accordance with one or more embodiments.

A reduction operation performed by a reduction operator (e.g., the reduction operator 850 of FIG. 8) may be changed from the reduction operation process 720 described above with reference to FIG. 7 to a reduction operation process 910 illustrated in FIG. 9 for real-time processing. In an example, the reduction operation process 910 may be largely divided into a first part or a first operation that reads a first maximum value $m_{Tile}$ and a first sum value $Sum_{Tile}$ that are derived from a first sub-softmax operation, calculating a second maximum value m that is a maximum value for all tiles and a second sum value $Sum_{ex}$, and storing the calculated second maximum value m and the calculated second sum value $Sum_{ex}$ in the memory 865, and a second part or a second operation that calculates an adjustment factor C using the second maximum value m and the second sum value $Sum_{ex}$ stored in the memory 865. The first part or operation may include operation processes 922, 924, and 926, and the second part or operation may include operation processes 932 and 934.

Specifically, in the first part, the reduction operator 850 may read the first maximum value $m_{Tile}$ and the first sum value $Sum_{Tile}$ that are calculated in the processors 812 and 814. In this example, the first maximum value $m_{Tile}$ and the first sum value $Sum_{Tile}$ may be transferred directly to the reduction operator 850 by bypassing the memory 844. In the operation process 926, the comparator 862 may determine a first maximum value $m_{Tile}$ and a second maximum value m of each tile of input data. The comparator 862 may compare the first maximum value $m_{Title}$ to a previous maximum value $m_{tile\_prev}$ that is a maximum value among values verified up to a previous tile. In the operation process 924, the adder-subtractor 864 may calculate a difference value $m_c'$ between the first maximum value $m_{Tile}$ and the previous maximum value $m_{tile\_prev}$ based on which one is greater or smaller between the first maximum value $m_{Tile}$ and the previous maximum value $m_{tile\_prev}$ The exponent processor 866 may obtain an exponentiated value $$e^{m_c'}$$

by exponentiating the difference value $m_c'$. In the operation process 922, the multiplication and division operator 868 may perform a multiplication operation between the first sum value $Sum_{Tile}$ and the exponentiated value $$e^{m_c'}$$

for data included in a current tile, and the adder-subtractor 864 may determine the second sum value $Sum_{ex}$ by adding all results of multiplications for tiles. The second sum value $Sum_{ex}$ may be determined as represented by Equation 5 below based on which one is greater or smaller between the first maximum value $m_{Tile}$ and the previous maximum value $m_{tile\_prev}$.

$$Sum_{ex} = Sum_{ex} + Sum_{tile} \times e^{m_{tile} - m_{tile\_prev}} \quad (\text{If } m_{tile\_prev} > m_{tile}) \quad \text{Equation 5}$$

$$Sum_{ex} = Sum_{ex} \times e^{m_{tile\_prev} - m_{tile}} + Sum_{tile} \quad (\text{If } m_{tile\_prev} < m_{tile})$$

The reduction operator 850 may repeatedly perform the foregoing processes on each of the tiles, and the second maximum value m and the second sum value $Sum_{ex}$ derived by performing the first part or operation based on operation processes 922, 924, and 926, may be stored in the memory 865. When a summation operation is performed on all the tiles, a complete second sum value $Sum_{ex}$ may be obtained. The size of data corresponding to the second maximum value m and the second sum value $Sum_{ex}$ may generally correspond to only a few hundred kilobytes, and thus the data corresponding to the second maximum value m and the second sum value $Sum_{ex}$ may be stored in the memory 865 such as, but not limited to, an SRAM, and may then be used afterward.

In the second part or operation, which includes processes 932 and 934, the reduction operator 850 may read the first maximum value $m_{Tile}$ stored in the memory 842. In the operation process 932, the adder-subtractor 864 may calculate a resulting value $m_e$ by subtracting, from the first maximum value $m_{Tile}$, the second maximum value stored in the memory 865. The exponent processor 866 may determine a second exponentiated value $$e^{m_c}$$

by exponentiating $m_c$. In the operation process 934, the multiplication and division operator 868 may determine an adjustment factor C by dividing the second exponentiated value $$e^{m_c}$$

by the second sum value $Sum_{ex}$. The adjustment factor C may be transferred to the processing units 812 and 814, and the processing units 812 and 814 may determine a final resulting value of softmax by applying the adjustment factor C to the first exponentiated value $$e^{x_i'}$$

obtained in the first sub-softmax operation. The determined final resulting value of softmax may be immediately used for a subsequent second matrix operation.

Figure 10:
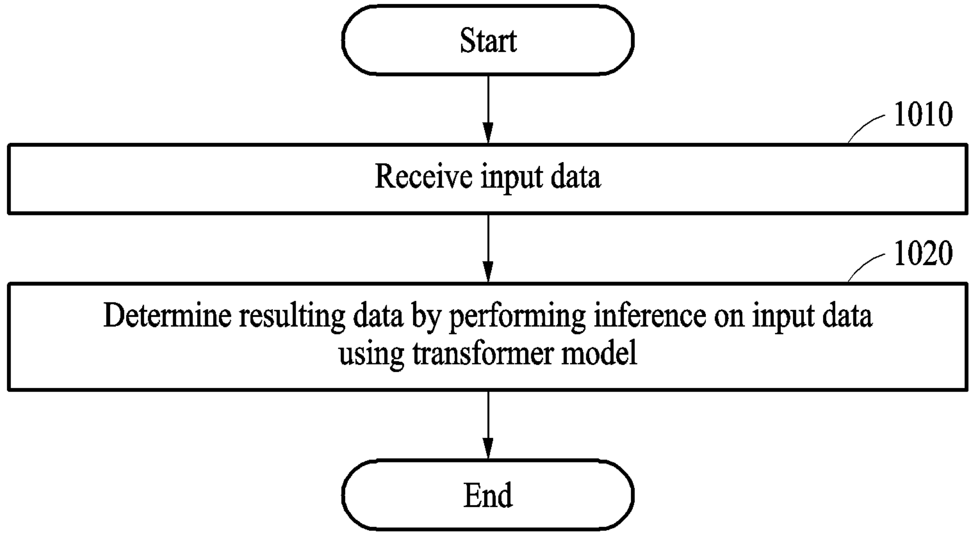
FIG. 10 illustrates an example inference method performed by an example electronic device, in accordance with one or more embodiments.

FIG. 10 illustrates an example inference method of an example electronic device. Operations of the inference method may be performed by an electronic device, for example, the electronic device 100 of FIG. 1. The operations in FIG. 10 may be performed in the sequence and manner as shown. However, the order of some operations may be changed, or some of the operations may be omitted, without departing from the spirit and scope of the shown example. Additionally, operations illustrated in FIG. 10 may be performed in parallel or simultaneously. One or more blocks of FIG. 10, and combinations of the blocks, can be implemented by special purpose hardware-based computer that perform the specified functions, or combinations of special purpose hardware and instructions, e.g., computer or processor instructions. In addition to the description of FIG. 10 below, the descriptions of FIGS. 1-9 are also applicable to FIG. 10 and are incorporated herein by reference. Thus, the above description may not be repeated here for brevity purposes. The operations of FIG. 10 may be performed by a processor.

Referring to FIG. 10, in operation 1010, the electronic device may receive input data. In a non-limited example, the input data may be data that is a target to be inferred and may be, as only an example, a sentence to be translated.

In operation 1020, the electronic device may determine resulting data by performing an inference on the input data by implementing a transformer model, (e.g., the transformer model 200 of FIG. 2), including a plurality of stacked encoders and a plurality of stacked decoders. The electronic device may determine the resulting data (e.g., a translated sentence or target sentence) corresponding to the input data (e.g., an original sentence to be translated) by using the transformer model. As described above, the transformer model may determine resulting data of a current time through processing in various blocks based on the input data (the original data) and resulting data (the translated data) of a previous time. The operation of determining the resulting data may include determining an attention value in each of the encoders and the decoders of the transformer model. Each of the encoders and the decoder may include an attention block to determine the attention value, and the electronic device may perform a softmax operation by decomposing the softmax operation to be performed in the attention block into a first sub-softmax operation, a reduction operation, and a second sub-softmax operation for fusion with matrix multiplication operations performed by a tile-wise operation. A processing process performed in the attention block will be described in detail with reference to FIG. 11.

Figure 11:
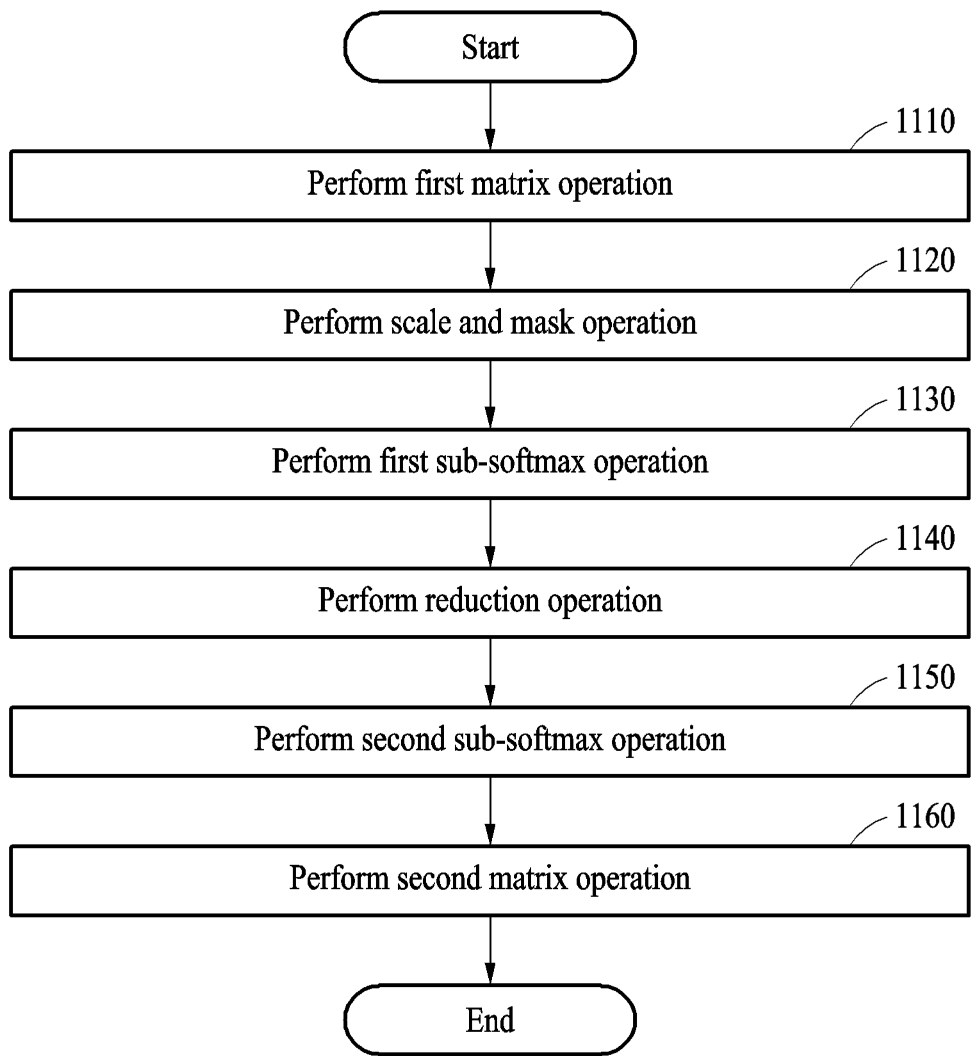
FIG. 11 illustrates an example of performing a softmax operation in an attention block of an example transformer model, in accordance with one or more embodiments.

FIG. 11 illustrates an example of performing a softmax operation in an attention block of a transformer model, in accordance with one or more embodiments. The operations in FIG. 11 may be performed in the sequence and manner as shown. However, the order of some operations may be changed, or some of the operations may be omitted, without departing from the spirit and scope of the shown example. Additionally, operations illustrated in FIG. 11 may be performed in parallel or simultaneously. One or more blocks of FIG. 11, and combinations of the blocks, can be implemented by special purpose hardware-based computer that perform the specified functions, or combinations of special purpose hardware and instructions, e.g., computer or processor instructions. In addition to the description of FIG. 11 below, the descriptions of FIGS. 1-10 are also applicable to FIG. 11, and are incorporated herein by reference. Thus, the above description may not be repeated here for brevity purposes. The operations of FIG. 11 may be performed by a processor.

Referring to FIG. 11, in operation 1110, an electronic device may perform a first matrix operation on input data based on a query and a key. In the first matrix operation, a matrix-matrix multiplication operation between the query and the key each having a matrix form of a tile unit may be performed.

In operation 1120, the electronic device may perform a scale and mask operation on a resulting value of the first matrix operation. The electronic device may perform a scaling process to adjust the size of the resulting value of the first matrix operation and a masking process to avoid or prevent an effect of specific data on resulting data.

In operation 1130, the electronic device may perform a first sub-softmax operation in a tile-wise manner. The first sub-softmax operation may include detecting a first maximum value based on a tile-wise operation from the input data, determining a first exponentiated value of a resulting value obtained by subtracting a corresponding first maximum value from each value of the input data, and determining a first sum value of the first exponentiated value tile-wise.

In operation 1140, the electronic device may perform a reduction operation based on a result of the first sub-softmax operation. The electronic device may determine an adjustment factor based on a resulting value of the first sub-softmax operation. The reduction operation may include determining a second exponentiated value of a resulting value obtained by subtracting a second maximum value (which is a maximum value for all tiles of the data) from the first maximum value derived from the first sub-softmax operation, determining a second sum value by applying a second exponentiated value corresponding to each tile of the data to the first sum value determined in the first sub-softmax operation, and determining, to be the adjustment factor, a resulting value obtained by dividing the second exponentiated value by the second sum value.

According to examples, the reduction operation may be performed by a reduction operator (e.g., the reduction operator 850 of FIG. 8) including a comparator, an adder-subtractor, an exponent processor, a multiplication and division operator, and a memory.

In operation 1150, the electronic device may perform a second sub-softmax operation in a tile-wise manner based on a resulting value of the reduction operation. The electronic device may apply (e.g., multiply) the adjustment factor derived from the reduction operation to the first exponentiated value derived from the first sub-softmax operation.

In operation 1160, the electronic device may perform a second matrix tile-wise operation based on a resulting value of the second sub-softmax operation. The second matrix operation may include a matrix multiplication between the resulting value of the second sub-softmax operation and a value mapped to the key, and the resulting value of the second matrix operation may be determined to be an attention value.

The electronic devices, processors, memories, calculators, reduction operator, comparator, adder-subtractor, exponent processor, multiplication and division operator, and other devices, apparatuses, units, modules, and components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-11, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:

a processor configured to implement a transformer model for processing a sentence in natural language processing (NLP), the transformer model comprising a plurality of encoders and a plurality of decoders; and a memory configured to store instructions to be executed by the processor, wherein each of the plurality of encoders and the plurality of decoders comprise an attention block that is configured to determine an attention value corresponding to a similarity between words in an input sentence, and wherein, when the instructions are executed by the processor, the processor is further configured to:

perform, in an inference operation a first sub-softmax tile-wise operation in the attention block, perform a reduction operation to determine an adjustment factor based on a resulting value of the first sub-softmax tile-wise operation, and perform a second sub-softmax tile-wise operation based on a resulting value of the reduction operation.

2. The electronic device of claim 1, wherein the processor is further configured to:

perform a first matrix operation based on a query and a key, and perform the first sub-softmax tile-wise operation based on a resulting value of the first matrix operation.

3. The electronic device of claim 2, wherein the processor is further configured to:

perform a scale and mask operation on the resulting value of the first matrix operation, and perform the first sub-softmax tile-wise operation based on a resulting value of the scale and mask operation.

4. The electronic device of claim 1, wherein the processor is further configured to:

perform the first sub-softmax tile-wise operation by detecting a first maximum value tile-wise from the input sentence, determining a first exponentiated value of a resulting value obtained by subtracting the first maximum value from each value of the input sentence, and determining a first sum value of the first exponentiated value tile-wise.

5. The electronic device of claim 2, wherein the first matrix operation and the first sub-softmax operation are same in a data reading order and a data reading unit.

6. The electronic device of claim 4, wherein the processor is further configured to:

perform the reduction operation by:

determining a second exponentiated value of a resulting value obtained by subtracting, from the first maximum value, a second maximum value which is a maximum value of all tiles of the data;

determining a second sum value by applying, to the first sum value, the second exponentiated value corresponding to each tile of the data; and determining, to be the adjustment factor, a resulting value obtained by dividing the second exponentiated value by the second sum value.

7. The electronic device of claim 6, wherein the processor is further configured to:

perform the second sub-softmax operation by applying the adjustment factor to the first exponentiated value.

8. The electronic device of claim 1, wherein the processor is further configured to:

perform a second tile-wise matrix operation based on a resulting value of the second sub-softmax tile-wise operation and a given data value.

9. The electronic device of claim 8, wherein the second sub-softmax tile-wise operation and the second tile-wise matrix operation are same in a data reading order and a data reading unit.

10. An electronic device, comprising:

a processor configured to implement a transformer model for processing a sentence in natural language processing (NLP), the transformer model comprising a plurality of encoders and a plurality of decoders;

a memory configured to store instructions to be executed by the processor; and reduction circuitry, wherein each of the plurality of encoders and the plurality of decoders comprise an attention block that is configured to determine an attention value corresponding to a similarity between words in an input sentence, wherein, when the instructions are executed by the processor, the processor is further configured to perform a first sub-softmax tile-wise operation in the attention block, wherein the reduction circuitry is configured to perform a reduction operation to determine an adjustment factor based on a resulting value of the first sub-softmax tile-wise operation, and wherein the processor is further configured to perform a second sub-softmax tile-wise operation based on a resulting value of the reduction operation.

11. The electronic device of claim 10, wherein the processor is configured to perform, in an inference operation, the first sub-softmax tile-wise operation by detecting a first maximum value tile-wise from the input sentence, determining a first exponentiated value of a resulting value obtained by subtracting the first maximum value from each value of the input sentence, and determining a first sum value of the first exponentiated value tile-wise.

12. The electronic device of claim 11, wherein the reduction circuitry comprises a comparator, an adder-subtractor, an exponent processor, a multiplication and division operator, and another memory.

13. The electronic device of claim 12, wherein the reduction circuitry is configured to:

read the first maximum value and the first sum value from the other memory;

detect, by the comparator, a second maximum value which is a maximum value of all tiles of the input sentence;

determine, by the adder-subtractor, a resulting value obtained by subtracting, from the first maximum value, a second maximum value detected row-wise from the input sentence;

determine, by the exponent processor, a second exponentiated value of a resulting value obtained by subtracting the second maximum value from the first maximum value; and determine, by the multiplication and division operator, a second sum value by applying the second exponentiated value corresponding to each tile of the input sentence to the first sum value and determine, to be the adjustment factor, a resulting value obtained by dividing the second exponentiated value by the second sum value.

14. The electronic device of claim 13, wherein the processor is further configured to:

perform the second sub-softmax operation by applying the adjustment factor to the first exponentiated value.

15. A processor-implemented method, comprising:

determining, by a processor, resulting data from input sentence by performing an inference on the input sentence by implementing a transformer model for processing a sentence in natural language processing (NLP), the transformer model comprising a plurality of encoders and a plurality of decoders, wherein the determining of the resulting data by the processor comprises:

determining an attention value corresponding to a similarity between words in the input sentence, from each of the plurality of encoders and the plurality of decoders, wherein the determining of the attention value comprises:

performing a first sub-softmax tile-wise operation;

performing a reduction operation to determine an adjustment factor based on a resulting value of the first sub-softmax tile-wise operation; and performing a second sub-softmax tile-wise operation based on a resulting value of the reduction operation.

16. The method of claim 15, wherein the performing of the first sub-softmax tile-wise operation comprises:

detecting a first maximum value tile-wise from the input sentence;

determining a first exponentiated value of a resulting value obtained by subtracting the first maximum value from each value of the input sentence; and determining a first sum value of the first exponentiated value tile-wise.

17. The method of claim 16, wherein the performing of the reduction operation comprises:

determining a second exponentiated value of a resulting value obtained by subtracting, from the first maximum value, a second maximum value which is a maximum value of all tiles of the input sentence;

determining a second sum value by applying, to the first sum value, the second exponentiated value corresponding to each tile of the input sentence; and determining, to be the adjustment factor, a resulting value obtained by dividing the second exponentiated value by the second sum value.

18. The method of claim 17, wherein the performing of the second sub-softmax operation comprises:

applying the adjustment factor to the first exponentiated value.

19. The method of claim 15, wherein the reduction operation is performed by a reduction operator comprising a comparator, an adder-subtractor, an exponent processor, a multiplication and division operator, and a memory.

20. A non-transitory computer-readable storage medium storing instructions that, when executed by a processor, cause the processor to perform the inference method of claim 15.

* * * * *